Aug. 4, 1964

A. J. DE VRIES 3,143,600

A.M. STEREO SYSTEM

Filed Feb. 15, 1962

2 Sheets-Sheet 1

INVENTOR.
Adrian J. De Vries
BY
Francis W. Crotty
Atty.

INVENTOR.
Adrian J. DeVries
BY
Francis W. Crotty
Atty.

3,143,600
Patented Aug. 4, 1964

3,143,600

A.M. STEREO SYSTEM

Adrian J. De Vries, Elmhurst, Ill., assignor to Zenith Radio Corporation, Chicago, Ill., a corporation of Delaware Filed Feb. 15, 1962, Ser. No. 173,497
8 Claims. (Cl. 179—15)

The present invention concerns a receiver for a sterophonic broadcasting system using a carrier signal having two different forms of modulation each of which represents one of the pair of signals characteristically transmitted to effect stereophonic reproduction. More particularly, the type of system to which the invention is especially addressed is the so-called AM or amplitude modulation system.

In order to achieve compatibility, it is preferred that the amplitude modulation of the carrier correspond to the sum of the two signals required for stereophonic reproduction. These are referred to as the left and right hand signals or more generically, as the A and B audio signals. If the sum information is amplitude modulated on the carrier, any monophonic amplitude-modulation receiver may derive the full benefit of the broadcast program. While the difference information, more specifically the A minus B information, may be transmitted as phase or frequency modulation, it is presently contemplated that it will be transmitted by frequency modulation of the carrier.

A stereophonic receiver which immediately suggests itself for such a system is one having an amplitude modulation detector for deriving the sum information, a frequency modulation detector for obtaining the difference information and a matrix for operating on both to develop separate A and B audio signals for application to sound reproducers. While such a receiver may operate satisfactorily in the reproduction of the stereophonic broadcast under consideration, it is desirable to realize a receiver construction which obviates the need for separate and distinct AM and FM detection. That objective is attainable with the receiver structure to be described.

Accordingly, it is an object of the invention to provide a novel receiver for a stereophonic broadcasting system in which a carrier signal has both amplitude and angular-velocity modulation with one form of modulation representing the sum and the other representing the difference of a pair of audio program signals.

A more specific object of the invention is to provide a novel receiver for obtaining separated audio program signals from a carrier which is amplitude modulated by the sum of such signals and is frequency modulated by their difference.

Still another object of the invention is to provide a detector which responds to both amplitude and angular-velocity modulation characterized by controllable response to these different forms of modulation.

The receiver of the invention is for utilization in a stereophonic broadcasting system featuring a carrier signal having amplitude modulation and angular-velocity modulation of which one form of modulation represents the sum and the other represents the difference of a pair of audio program signals. The receiver comprises means for selecting the carrier and means including a detector for demodulating the amplitude modulation of the carrier.

This means further includes a discriminator for converting the angular-velocity modulation of the carrier into amplitude modulation for demodulation by the amplitude-modulation detector. There are means in the receiver for effectively modifying the percentage of modulation of at least one of the aforesaid forms of modulation of the carrier to obtain equal response in the demodulating means to both forms of modulation. Finally, the receiver has means for deriving an output signal from the demodulating means corresponding predominantly to one of the audio program signals.

Basically, a control signal is derived from the carrier corresponding to one of its forms of modulation and this control signal is applied to a signal translating stage in the receiver to, in effect, operate on the modulated carrier and vary the percentage modulation of the carrier as to that form of modulation represented by the control signal. While a controlled reactance tube, for example, may be employed to modify the depth of frequency modulation, the preferred form of the invention, preferred because of its structural simplicity, contemplates the use of a degenerative amplifier for reducing the depth of amplitude modulation on the carrier.

Whatever approach is employed, the objective is to cause a detector, such as a slope detector, to give essentially equal responses to the two kinds of modulation on the carrier. When this is accomplished, a pair of such detectors may be employed to derive separated A and B audio signals directly.

The features of the invention which are believed to be novel are set forth in the appended claims. The invention, together with further objects and advantages thereof, may best be understood by reference to the following description taken in conjunction with the accompanying drawings in the several figures of which like reference characters identify corresponding components throughout, and in which:

Figures 1, 5, 6:
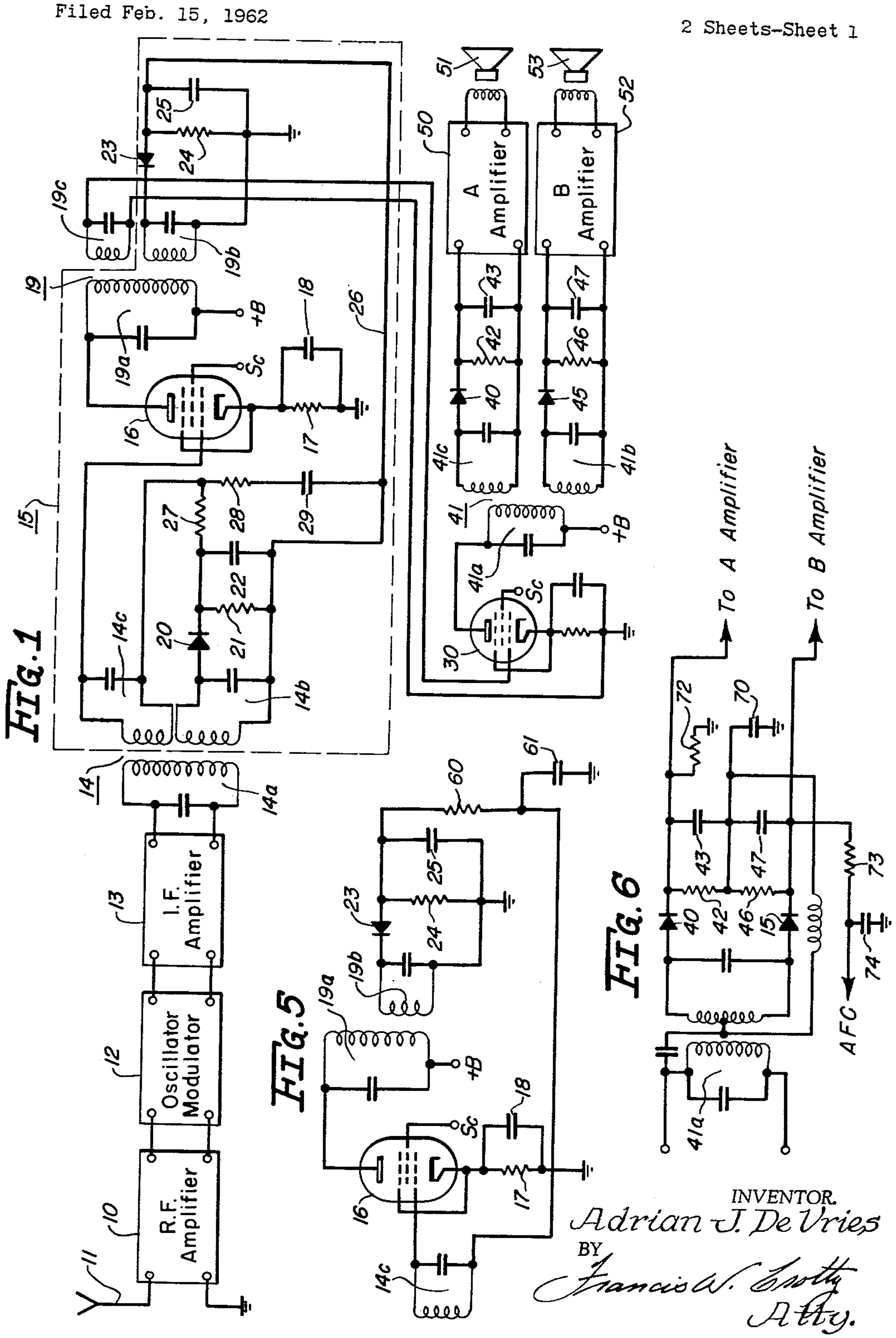
FIGURE 1 is a schematic representation of a stereophonic receiver constructed in accordance with one form of the invention.
FIGURES 5 and 6 individually represent a modified form of various portions of the receiver of FIGURE 1.

Before considering the structural details and operation of the receiver, it is appropriate to particularize as to the essential ingredients of the carrier signal of the transmission to which the receiver is to respond. It will be assumed that the stereophonic broadcasting system has at its transmitting end suitable apparatus for developing and radiating a carrier signal having both amplitude modulation and angular-velocity modulation, one form of modulation representing the sum and the other representing the difference of a pair of audio program signals. More specifically, it will be assumed that the carrier is amplitude modulated to a modulation depth of 80 percent by the sum of two audio signals designated A and B. It will be further assumed that the carrier is frequency modulated to a maximum deviation of ±2 kc. with the difference of the same pair of audio program signals. The modulation in each case shall represent the full audio spectrum extending to approximately 15 kilocycles.

The receiver for utilizing the broadcast includes a radio-frequency amplifier 10 having any desirable number of tunable stages and having input terminals connected with an antenna system 11. This amplifier serves as means for selecting the carrier signal conveying the program information to be reproduced. Coupled to the RF amplifier is an oscillator modulator or converter 12 having a local oscillator for providing a heterodyning signal and, as is customary, tuned concurrently with the tunable stages of amplifier 10. An intermediate-frequency amplifier 13 is coupled to the output terminals of oscillator modulator 12. The output circuit of amplifier 13 includes the tuned primary 14*a* of a coupling transformer 14. The secondary and tertiary windings of the transformer are designated 14*b* and 14*c* and are included in the signal translating stage designated by a broken-line rectangle 15. This stage serves to apply the intermediate-frequency signal of the receiver to a demodulating means, presently to be described, and there is included in stage 15 means responsive to a control signal for effectively modifying the percentage of modulation of at least one of the forms of modulation of the received carrier. More specifically, the means for modifying the percentage of modulation comprises an amplifier shown as a pentode 16 having a cathode connected to ground through a self-biasing network provided by a resistor 17 and a by-pass capacitor 18. The anode of the pentode connects to a source of energizing potential designated +B through the tuned primary 19*a* of a transformer 19.

In order to effectively change the modulation percentage of the amplitude modulation of the carrier as translated by tube 16, stage 15 further includes means for deriving a control signal corresponding to the amplitude modulation of the carrier. Actually, two such control signals are derived, being of nearly equal amplitude, for application to the input of tube 16 in phase opposition. One such control signal is derived in a detector circuit provided by tuned secondary 14*b* of transformer 14, a diode rectifier 20 and a load circuit shown as a resistor 21 shunted by a by-pass capacitor 22.

The companion control signal is derived in a generally similar detector circuit provided by tuned secondary 19*b* of transformer 19, a diode rectifier 23 and a load resistor 24 by-passed by a capacitor 25. It will be observed, however, that the diode rectifiers 20 and 23 are poled oppositely so that the connection represented by conductor 26 extending between load circuits 21, 22 and 24, 25 causes the control signals to be combined in phase opposition. These two control signals are applied to the control grid or input electrode of tube 16 through an attenuator comprising a series resistor 27 and a shunt branch including a resistor 28 and a capacitor 29. The attenuating network 27–29 passes the D.C. component and low frequency signals with little or no attenuation but accomplishes attenuation of the audio components above 50 cycles per second, for example, in a ratio of approximately four to one. This ratio, in any case, is determined by the parameters of the system including the Q of the final signal detector, the frequency deviation, the percent of amplitude modulation and so forth. It is accomplished by choosing the values of resistors 27 and 28. The change in the weighting of the A.C. and D.C. components of the detected amplitude modulation is utilized in a manner to be described more particularly to obtain essentially equal response in the signal demodulators, presently to be considered, to both the amplitude and frequency modulation of the carrier.

The input circuit of tube 16 is completed by the tuned tertiary 14*c* of transformer 14 through which a component of the IF signal is applied concurrently with both of the aforedescribed control signals obtained from detectors 20 and 23. This IF component is small in peak-to-peak value compared with the components contributed by windings 14*b* and 19*b*.

The tuned tertiary 19*c* of transformer 19 is coupled through another tuned amplifier, including a self-biased pentode 30, to signal demodulating means. The demodulating means include a pair of slope detectors for demodulating the amplitude modulation of the received carrier and individually including a discriminator for converting the frequency modulation of the carrier into amplitude modulation for demodulation by the detectors. As shown, one of the slope detectors includes a diode 40 having an input 41*c* which is the tertiary of tuned transformer 41. The load circuit of rectifier 40 is provided by a resistor 42 and a shunt capacitor 43. Similarly, the other slope detector comprises a diode 45, the tuned secondary 41*b* of transformer 41, a load resistor 46 and a by-pass capacitor 47. The low Q primary 41*a* of transformer 41 is tuned to the intermediate frequency of the receiver and is loosely coupled magnetically to the secondary and tertiary windings. The secondary 41*b* is tuned to a frequency spaced a given amount in one direction from the intermediate frequency of the receiver while tertiary 41*c* is tuned to a frequency spaced a like amount but in the opposite direction from the intermediate frequency of the receiver in the usual way of adjusting slope tuned detectors.

The load circuits of the slope detectors serve as means for deriving output signals from the demodulators each of which preferably corresponds completely to one or the other of the A and B audio signals. As illustrated, the A audio signal is obtained from the circuit of detector 40 and is applied to an A amplifier 50 coupled to a sound reproducer or loudspeaker 51. The B audio signal on the other hand is derived from the circuit of detector 45 and is applied to a B amplifier 52 which drives a second loudspeaker 53 having such spatial relation to speaker 51 as to establish a pattern of stereophonic sound reproduction in the area served by the receiver.

Figure 2:
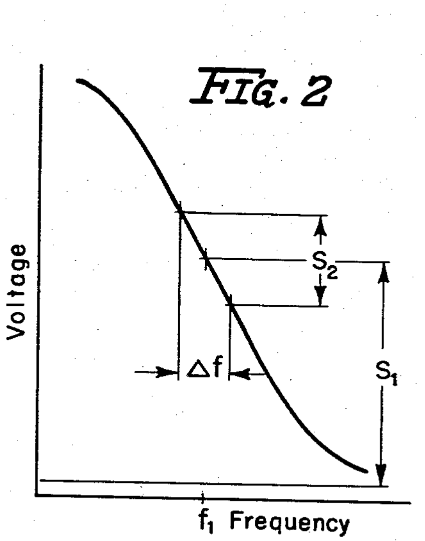
FIGURES 2 through 4 are curves used in explaining the operation of the receiver of FIGURE 1.

In considering the operation of the receiver, the function of stage 15 will be initially ignored in order to present more clearly the problem for which it affords a solution. The receiver is tuned to select from antenna 11 a stereophonic broadcast program featuring a carrier amplitude modulated with the sum and frequency modulated with the difference of A and B audio signals. This carrier is converted to an intermediate-frequency signal in oscillator modulator 12 and, after amplification in amplifier 13, is applied to slope detectors 40, 45. Each detector responds to both forms of modulation on the carrier as will be apparent from a consideration of FIGURE 2.

This figure shows a part of the selectivity characteristic of a slope detector and the explanation of its response will be predicated on the assumption that the carrier is modulated to a depth of 80 percent by amplitude modulation and is deviated plus and minus 2 kc. for frequency modulation. The signal output of the detector, dependent primarily on the amplitude of the carrier at an instantaneous frequency $f_1$, is related to dimension line $S_1$. In the assumed case, the peak to peak audio signal due to amplitude modulation is 0.80 times $2S_1$. On the other hand, its response due primarily to frequency deviations of the carrier over the range designated $\Delta f$ is shown by dimension line $S_2$. This dimension indicates the effect of the frequency discriminator in converting the frequency change $\Delta f$ to amplitude modulation that is detected by the detector in the usual fashion of utilizing a slope detector to demodulate a frequency modulated wave. Of course, it will be assumed that operation is over the linear portion of the response characteristic to avoid distortion. It is apparent from inspection that the response $S_1$ to amplitude modulation is greater than the response $S_2$ to frequency modulation. For a Q of 50 for the tuned circuit used in the slope detector and for the assumed specification of the system this difference is of the order of four to one.

For the receiver to yield cleanly separated A and B audio signals directly, without the intermediary of matrixing, it is essential that the response of the detector to amplitude and frequency modulation be approximately the same.

The explanation of the basic requirements of the detector will be simplified, while still retaining its validity, if one assumes the special case in which one of the audio signals is zero. Accordingly, the description will continue on the understanding that the B audio signal is zero. For this assumed special case one of the slope detectors is to yield only the A audio signal and the other slope detector is to give a zero output. If that condition is satisfied, cleanly separated A and B audio signals will be obtained even in the general case where neither the A nor B audio signal is equal to zero.

Figure 3:
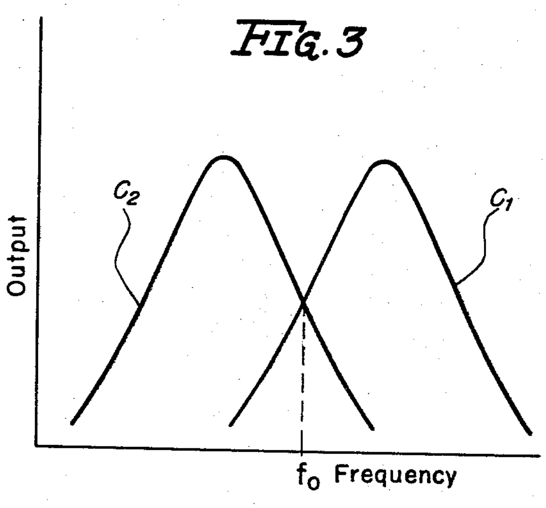

FIGURE 3 shows the response curves of the two slope detectors and their intercept is at a frequency $f_0$ which is the mean carrier frequency. Frequency changes, representing frequency modulation, occur in either direction but in symmetrical amounts with response to the reference frequency $f_0$. An incremental increase in carrier frequency yields an increased output from the slope detector having the characteristic $C_1$ but produces a decreased response from the slope detector having the characteristic $C_2$ and if operation is confined to the linear portion of the characteristics, the change in response, while being in opposite sense, is the same in magnitude. If the response of the slope detectors is the same for amplitude and frequency modulation, there are two signal components developed in the slope detector: (1) one because of the amplitude modulation and (2) another due to frequency modulation. Because of the relation of reference frequency $f_0$ to the intercept of response curves $C_1$ and $C_2$, the A.M. response adds to the F.M. response in one detector and subtracts in the other. Therefore, if the detector has essentially the same response to A.M. and F.M., one detector yields zero output for the assumed special case in which the B audio signal is zero but the other gives an output corresponding to twice the A audio signal.

Stage 15 makes possible the attainment of equal response to the amplitude and frequency modulation. This is accomplished by, in effect, reducing the depth of amplitude modulation of the carrier by approximately four to one as the complex modulated signal is translated through stage 15.

Figure 4:
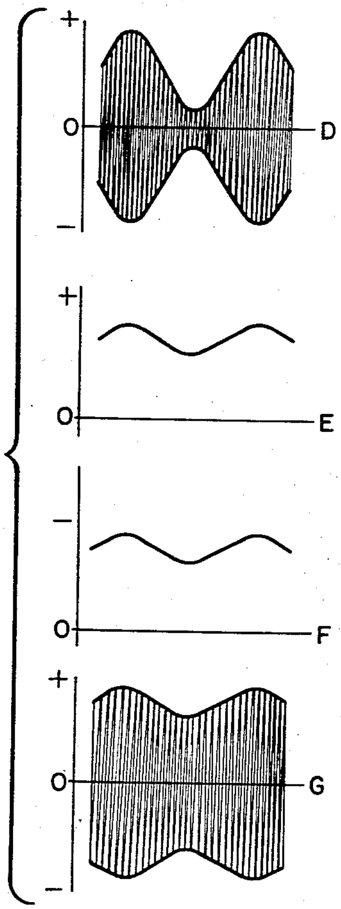

If the intermediate-frequency signal is represented by curve D in FIGURE 4, a control signal representing half the envelope of the intermediate frequency signal is derived in load circuit 21, 22 of rectifier 20. Attenuator 27–29 attenuates the A.C. components from approximately 50 cycles per second up, developing a first control signal shown in curve E.

The IF signal is also applied through tertiary winding **14*c* to the input electrode of pentode 16 for amplification and for application to the circuit of rectifier 23. This rectifier develops a second control signal which is essentially the same as the signal developed by rectifier 20 but is of opposite polarity because of the polarity arrangement of the diodes. The output of rectifier 23 is applied to pentode 16 in series with attenuator 27–29** and its wave form is shown in curve F. It is delivered concurrently with the signal of curve E to the input electrode of the amplifier.

The signal of curve F is applied in a degenerative sense and the conjoint effect of the signals of curves E and F, due to their control of the gain of amplifier 16, is represented by curve G, the signal developed in tuned output **19*a*. Contrasting the signals of curves D and G makes it clear that the essential change is in the relative weighting of the A.C. and D.C. components. The D.C. component is much smaller in curve D than in curve G or, expressed differently, the depth of modulation has been reduced by nearly 4-to-1. Since the depth of amplitude modulation has been reduced in a complementary sense to the predominance of the response otherwise obtained in the slope detectors to amplitude modulation, the slope detectors now exhibit essentially the same response to amplitude and to frequency modulation. Accordingly, detector 40 derives the clearly separated A audio signal for application to speaker 51 through amplifier 50 while detector 45 derives the clearly separated B audio signal which drives speaker 53 through amplifier 52. The energization of speakers 51 and 53** results in stereophonic reproduction.

The preferred arrangement of FIGURE 1 features two control signals which determine the degeneration of amplifier 16 in order to reduce the depth of amplitude modulation on the received carrier signal. The amount of degeneration is the differential amplitude of the control signals applied to the input electrode of the amplifier and is therefore essentially independent of the characteristics of the preceding stages of the amplifier assuming, of course, that these stages do not introduce distortion. A less perfect approach to the equalization of the response of the slope detector to amplitude and frequency modulation may be achieved with the modification represented in FIGURE 5. This arrangement differs from that of FIGURE 1 primarily in the fact that a single control signal is utilized to adjust the amplification of tube 16 to vary the depth of amplitude modulation. It will be observed that only the control signal developed in rectifier 23 is utilized for determining the extent of degeneration, this control signal being applied to the input electrode of amplifier 16 through an attenuator provided by a series resistor 60 and a shunt capacitor 61. This attenuator performs the same function as attenuator 27–29 of FIGURE 1, effecting essentially a 4-to-1 attenuation of audio signal components above 50 cycles. While this arrangement operates in generally the same fashion as that of FIGURE 1, it is dependent upon the characteristics of the preceding stages such as the amplification factor of tube and the like.

It is not necessary that slope filters be employed. An arrangement rather like the Seely-Foster discriminator is shown in FIGURE 6. It will perform the same general function of deriving cleanly separated A and B audio signals so long as the modulation depth has been changed to accomplish equal response to amplitude and frequency modulation within the detector. It will also be observed that the junction of the load networks of the detector diodes has an A.C. ground provided by a capacitor 70. One side of load circuit 42, 43 has a D.C. ground provided by a resistor 72 and the corresponding terminal of the other load circuit 46, 47, in addition to supplying the B audio signals, provides an automatic frequency control potential to the local or heterodyning oscillator. The A.F.C. potential is obtained through a filter including a series resistor 73 and a shunt capacitor 74.

While particular embodiments of the invention have been shown and described, modifications may be made, and it is intended in the appended claims to cover all such modifications as may fall within the true spirit and scope of the invention.

I claim:

1. In a stereophonic broadcasting system for utilizing a carrier signal having amplitude modulation and angular-velocity modulation of which one form of modulation represents the sum and the other represents the difference of a pair of audio program signals, a receiver comprising:
   - means for selecting said carrier signal;
   - means including a detector for demodulating said amplitude modulation and further including a discriminator for converting said angular-velocity modulation into amplitude modulation for demodulation by said detector;
   - means for effectively modifying the percentage of modulation of at least one of said forms of modulation on said carrier to obtain equal response in said demodulating means to both of said forms of modulation on said carrier;
   - and means for deriving an output signal from said demodulating means corresponding predominantly to one of said audio program signals.

2. In a stereophonic broadcasting system for utilizing a carrier signal having amplitude modulation representing the sum and angular-velocity modulation representing the difference of a pair of audio program signals, a receiver comprising:

means for selecting said carrier signal;

means including a detector for demodulating said amplitude modulation and further including a discriminator for converting said angular-velocity modulation into amplitude modulation for demodulation by said detector;

means for effectively modifying the percentage of modulation of at least said amplitude modulation on said carrier to obtain equal response in said demodulating means to both of said forms of modulation on said carrier;

and means for deriving an output signal from said demodulating means, corresponding predominantly to one of said audio program signals.

3. In a stereophonic broadcasting system for utilizing a carrier signal having amplitude modulation and angular-velocity modulation of which one form of modulation represents the sum and the other represents the difference of a pair of audio program signals, a receiver comprising:

means for selecting said carrier signal;

means including a detector for demodulating said amplitude modulation and further including a discriminator for converting said angular-velocity modulation into amplitude modulation for demodulation by said detector;

an amplifier for applying said carrier signal to said demodulating means;

means for deriving a control signal corresponding to the amplitude modulation of said carrier signal;

means for applying said control signal to said amplifier in a degenerative sense to effectively modify the percentage of modulation of said amplitude modulation on said carrier to obtain equal response in said demodulating means to both of said forms of modulation on said carrier;

and means for deriving an output signal from said demodulating means corresponding predominantly to one of said audio program signals.

4. In a stereophonic broadcasting system for utilizing a carrier signal having amplitude modulation and angular-velocity modulation of which one form of modulation represents the sum and the other represents the difference of a pair of audio program signals, a receiver comprising:

means for selecting said carrier signal;

means including a detector for demodulating said amplitude modulation and further including a discriminator for converting said angular-velocity modulation into amplitude modulation for demodulation by said detector;

a signal-translating stage for applying said carrier signal to said demodulating means and including means, responsive to a control signal, for effectively modifying the percentage of modulation of one of said forms of modulation on said carrier;

means for deriving a control signal corresponding to the modulation of said carrier of said one form;

means for applying said control signal to said modulation-modifying means to effectively modify the percentage of modulation of said one form of modulation on said carrier to obtain equal response in said demodulating means to both of said forms of modulation on said carrier;

and means for deriving an output signal from said demodulating means corresponding predominantly to one of said audio program signals.

5. In a stereophonic broadcasting system for utilizing a carrier signal having amplitude modulation and angular-velocity modulation of which one form of modulation represents the sum and the other represents the difference of a pair of audio program signals, a receiver comprising:

means for selecting said carrier signal;

means including a detector for demodulating said amplitude modulation and further including a discriminator for converting said angular-velocity modulation into amplitude modulation for demodulation by said detector;

an amplifier for applying said carrier signal to said demodulating means;

means for deriving a pair of control signals individually corresponding to the amplitude modulation of said carrier signal, one of said control signals being larger than the other;

means for applying said pair of control signals in phase opposition to said amplifier with said larger signal being applied in a degenerative sense to effectively modify the percentage of modulation of said amplitude modulation on said carrier to obtain equal response in said demodulating means to both of said forms of modulation on said carrier;

and means for deriving an output signal from said demodulating means corresponding predominantly to one of said audio program signals.

6. A receiver for use in a stereophonic broadcast system comprising:

a source of stereophonic program signals comprising a carrier signal amplitude-modulated in accordance with one of a pair of sum and difference signals and angular-velocity modulated in accordance with the other of said pair of signals;

an amplifier coupled to said source;

detecting means coupled to said amplifier and having different detecting efficiencies for amplitude-modulation and angular-velocity-modulation detection for developing a pair of stereophonic intelligence signals;

means coupled to said source for deriving a correction signal corresponding to a modulation component of said stereophonic program signals;

and means for applying said correction signal to said amplifier for varying an operating characteristic thereof to modify the modulation percentage of at least one of said pair of signals on said carrier signal as applied to said detecting means by an amount substantially compensating for said different detecting efficiencies.

7. A receiver for use in a stereophonic broadcast system comprising:

a source of stereophonic program signals comprising a carrier signal amplitude-modulated in accordance with one of a pair of sum and difference signals and angular-velocity modulated in accordance with the other of said pair of signals;

an amplifier coupled to said source;

detecting means coupled to said amplifier and having different detecting efficiencies for amplitude-modulation and angular-velocity-modulation detection for developing a pair of stereophonic intelligence signals;

means coupled to said source for deriving a correction signal corresponding to the amplitude-modulation component of said stereophonic program signals;

and means for applying said correction signal to said amplifier for varying an operating characteristic thereof to modify the modulation percentage of the amplitude-modulation on said carrier signal as applied to said detecting means by an amount substantially compensating for said different detecting efficiencies.

8. A receiver for use in a stereophonic broadcast system comprising:

a source of stereophonic program signals comprising a carrier signal amplitude-modulated in accordance with one of a pair of sum and difference signals and angular-velocity modulated in accordance with the other of said pair of signals;

an amplifier coupled to said source;

detecting means coupled to said amplifier and having different detecting efficiencies for amplitude-modulation and angular-velocity-modulation detection for developing a pair of stereophonic intelligence signals;

means coupled to said source for deriving a correction signal corresponding to the amplitude-modulation component of said stereophonic program signals;

means coupled to the output circuit of said amplifier for developing a control signal corresponding to the amplitude-modulation of the carrier signal of said output circuit;

and means for applying said correction and control signals to said amplifier for varying an operating characteristic thereof to modify the modulation percentage of the amplitude-modulation on said carrier signal as applied to said detecting means by an amount substantially compensating for said different detecting efficiencies.

References Cited in the file of this patent

UNITED STATES PATENTS

| | | |
|---|---|---|
| 2,251,382 | Sziklai | Aug. 5, 1941 |
| 2,363,649 | Crosby | Nov. 28, 1944 |
| 2,480,575 | Hare | Aug. 30, 1949 |
| 3,068,323 | Dome | Dec. 11, 1962 |